INVENTOR.
Craig Marks
BY
Robert J. Outland
ATTORNEY

United States Patent Office 3,487,815
Patented Jan. 6, 1970

3,487,815
ROTARY ENGINE WITH MEANS FOR CAUSING MIXTURE TURBULENCE
Craig Marks, Grosse Pointe Woods, Mich., assignor to General Motors Corporation, Detroit, Mich., a corporation of Delaware
Filed Feb. 15, 1968, Ser. No. 705,713
Int. Cl. F02b 55/08, 55/16, 53/10
U.S. Cl. 123—8                                      9 Claims

ABSTRACT OF THE DISCLOSURE

A rotary internal combustion engine having a plurality of variable volume working chambers movable with an eccentrically rotatable piston member around the interior of a stationary housing includes mixture turbulating means comprising an accumulator volume arranged to receive pressurized gas sequentially from each working chamber during high pressure portions of its cycle and to discharge the gas through a jet creating orifice into the following working chamber during low pressure portions of its cycle so as to create turbulence in the combustible mixture therein.

FIELD OF THE INVENTION

This invention relates to rotary internal combustion engines and more particularly to an engine of the eccentric rotating piston type having means for causing turbulence in the working chamber charge.

DESCRIPTION OF THE PRIOR ART

Among the characteristic problems of rotary internal combustion engines in the problem of slow burning of the fuel-air mixture in the working chamber which prevents the completion of combustion of the working chamber charge before the exhaust process begins. As a result, such engines lose power and economy and have relatively high emissions of hydrocarbons in the exhaust.

Two reasons for the relatively slow combustion process in such engines are poor combustion chamber shape and lack of turbulence in the working chamber charge. In many cases, the shape of the combustion chamber is fixed to a great extent by design of the engine. However, modifications to generate turbulence in the working chamber charge are possible.

SUMMARY OF THE INVENTION

This invention proposes means for use in rotary internal combustion engines for improving turbulence in the working chamber mixture for the purpose of increasing the speed of combustion. The invention is applicable to engines having a plurality of variable volume working chambers moving with an eccentrically rotating piston member and defined between the piston and a surrounding stationary housing.

The invention contemplates an accumulator volume in the housing and opening to the various working chambers in sequence. The volume is so positioned as to receive pressurized gases periodically from each chamber on its compression phase or during the combustion process or both and to expel such pressurized gases into each following working chamber during portions of its intake phase and possibly the early stages of the compression phase.

Means such as an orificed check valve may be utilized to permit free entry of gases into the accumulator volume while causing the expulsion of gases therefrom into the working chamber to be in the form of a high velocity jet so as to increase the degree of turbulence caused therein. Various modifications of the concept may, of course, be developed.

DESCRIPTION OF THE PREFERRED EMBODIMENT

Figure 1:
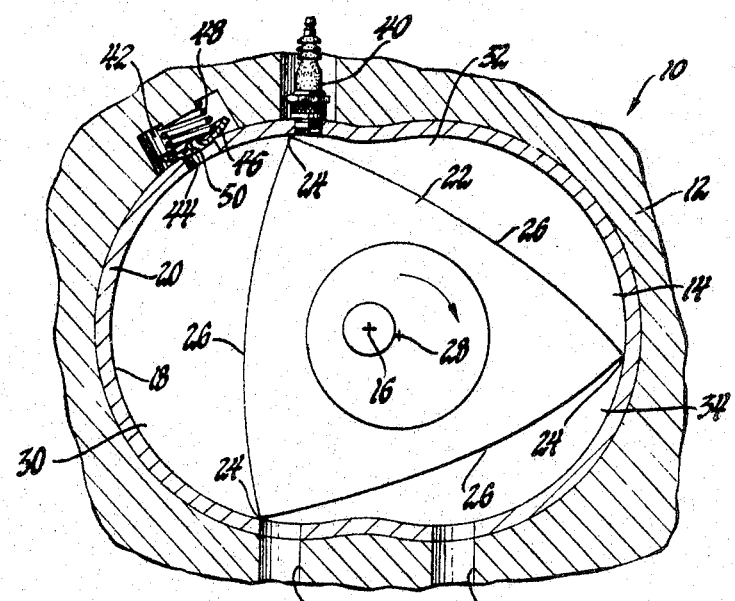
FIGURE 1 is a fragmentary cross-sectional view of a rotary internal combustion engine including mixture turbulating means according to the invention.

The following description of a preferred embodiment of the invention should aid in the understanding of its possible constructions and purpose.

Referring to the drawings, numeral 10 generally indicates a rotary internal combustion engine having a stationary housing 12 defining a symmetrically lobed cavity 14 of generally trochoidal shape. Cavity 14 is centered on an axis 16 and is surrounded by a peripheral inner wall 18 which comprises one side of a liner member 20. Within the cavity is a generally triangular piston member 22 having three apices 24 connected by an equal number of slightly convex working faces 26.

Piston 22 has an axis 28 around which it is rotatable in a clockwise direction while at the same time the axis 28 rotates in a clockwise direction around the cavity axis 16 causing an eccentric rotation of the piston 22 within the cavity. During such rotation apices 24 of the piston contact the inner wall 18 at all times and so define therewith three separate working chambers 30, 32 and 34. These chambers move around within the housing with the rotation of piston 22 so as to move sequentially past any given point on the inner wall 18. Housing 12 further includes inlet and exhaust openings 36 and 38, respectively, and a spark plug 40, all of which are conventionally located for the type of engine described.

All of the foregoing, with the possible exception of the liner member 20, disclose a known type of rotary internal combustion engine as to which further description is not believed necessary.

The present invention adds to the previously described construction an accumulator volume 42 located in the housing, or alternatively adjacent thereto, and connected with cavity 14 through an opening 44 through the liner member 20 and inner wall 18. A dished check valve 46 is arranged within volume 42 and is biased by a spring 48 into engagement with liner 20 so as to close the opening 44. Check valve 46 includes a nozzle-like orifice 50 permitting limited communication between volume 42 and cavity 14 at all times.

The operation of the above described construction is as follows. Eccentric rotation of the piston 22 within cavity 14 moves the working chambers 30, 32 and 34 through four phases of operation: intake, compression, expansion and exhaust. On the intake phase, each working chamber is connected with intake opening 36 while its volume is expanded, drawing a combustible mixture into the chamber through the intake opening. As the chamber moves clockwise to the position of chamber 30 as shown in FIGURE 1, its communication with the intake opening 36 terminates and the compression phase begins wherein the volume of the chamber is reduced as it moves clockwise to a position at the top of the cavity 14 where the working chamber acts as a combustion chamber.

Near the end of the compression phase, the combustible mixture is ignited by spark plug 40. This initiates burning of the mixture which continues into the expansion phase indicated by the position of chamber 32 of FIGURE 1. When the clockwise movement of the chamber brings it into communication with exhaust passage 38, the exhaust phase begins wherein the burned products are forced out of the working chamber. The position of working chamber 34 of FIGURE 1 illustrates the near end of the exhaust phase and the beginning of a brief overlapping period which starts the intake phase.

The accumulator volume 42 is positioned with its opening 44 connecting with cavity 14 at a predetermined point such that pressurized gas is forced into the volume 42 from each working chamber during at least a portion of its compression stroke and possibly part of the expansion stroke. Check valve 46 opens to permit gas to be freely received from volume 42. The flow of gas into the accumulator volume 42 continues as long as a working chamber is connected with the volume 42 and the pressure in that chamber is increasing.

At a desired point, depending upon the position of opening 44 on the cavity wall, the apex 24 of the piston passes over opening 44 cutting off its communication with the compressed gases of one working chamber and connecting the accumulator volume with the following working chamber which is at this point at some stage of its intake phase or possibly an early point of the compression phase depending on the accumulator opening position. This communication with the lower pressure working chamber causes the closing of valve 46 and the expulsion through orifice 50 of the compressed gases in accumulator 42. The gases are forced into the lower pressure working chamber in the form of a high velocity jet, thereby stirring and causing turbulence in the combustible mixture within the chamber. This turbulence results in better mixing of the air and fuel and, more importantly, persists in some degree until the combustion process causing faster and more efficient burning of the mixture.

As the pressure in the chamber increases during the compression phase, the turbulence creating flow ceases and flow is reversed, again increasing the pressure in the accumulator volume 42 and repeating the above described process so as to cause turbulence in the next following working chamber.

Figure 2:
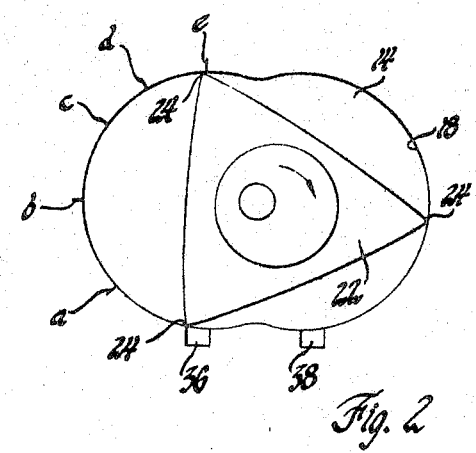
FIGURE 2 is a diagrammatic view of an engine of the type shown in FIGURE 1 and indicating some of the positions in which such mixture turbulating means could be located.
Figure 3:
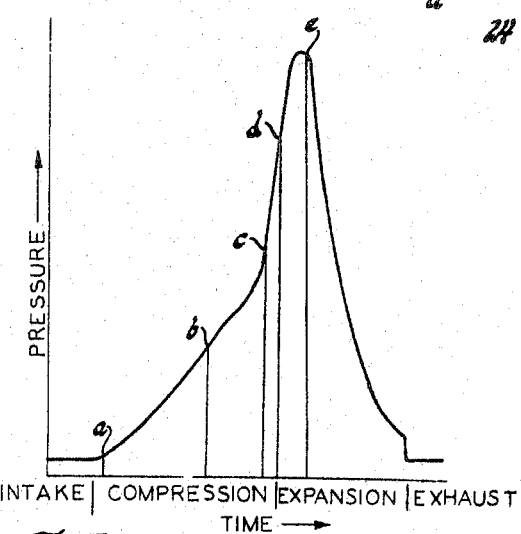
FIGURE 3 is a pressure-time diagram illustrating working chamber pressures at various points in the operating cycle and relating them to the pressure received in the accumulator volume at the various positions of FIGURE 2.

The amount and effect of the turbulence producing jet may be varied to a considerable degree by the position of the accumulator opening 44 on the wall of cavity 14. This is indicated by FIGURES 2 and 3, the latter of which discloses a pressure-time diagram for the various phases of an individual working chamber. FIGURE 2 illustrates a number of positions, indicated as *a* through *e*, around the wall of the cavity at which the connection of the accumulator 42 with cavity 14 might conceivably be made. The letters *a* through *e* on the diagram of FIGURE 3 indicate pressure conditions existing in the leading working chamber and therefore in the accumulator volume 42 at the various points of FIGURE 2 at the time when the transfer from one working chamber to the next is made. Thus, it is seen that at point *a*, the compression is so small that no effect would result from positioning the accumulator volume opening at this point. Points *b* and *c* represent increasing pressure locations in the compression phase, point *c* representing a point immediately before the beginning of combustion in the working combustion chamber. Point *d* represents a point after the start of combustion and at about the end of the compression phase, while point *e* represents a higher pressure point reached due to continuing combustion during the expansion phase.

It should be apparent that the closer to point *e* the accumulator volume connection with the cavity is placed, the higher would be the pressure reached in the accumulator volume and the greater the degree of turbulence produced in the following working chamber upon expulsion of the gas into it.

On the other hand, continued connection of a working chamber with the accumulator volume, after the beginning of combustion, may result in excessive temperatures affecting the operation of the check valve or causing burning in the accumulator volume itself and possibly pre-ignition in the following chamber. Accordingly, it may not be possible in some cases to locate the accumulator volume opening between points *c* and *e*. Location at point *c* will, however, take advantage of the major portion of the compression phase and deliver a turbulating jet of gas into the following working chamber during the latter portions of its intake phase. The proper position for the accumulator volume connection to the cavity would, of course, be a matter for determination with respect to each particular engine design.

Among other variables which would have an effect on the period and degree of turbulence created in the working chamber charge are the size of the accumulator volume 42 and the diameter of orifice 50. These may, of course, be chosen as needed to obtain optimum operating conditions in a particular engine.

I claim:
1. A rotary internal combustion engine of the type comprising a housing having a cavity containing an eccentrically rotatable piston and defining with said housing a plurality of variable volume working chambers spaced around said piston and arranged to move therewith within the housing and to pass through cyclic phases of intake, compression, expansion and exhaust during predetermined parts of their movement, said engine including the improvement of
accumulator means in the housing and opening to said cavity at a single desired location on its periphery so as to be connected in sequence with each working chamber during a period of elevated pressure in the charge therein to receive compressed gas therefrom and to be subsequently connected in turn with each following working chamber during a period of relatively lower pressure of the charge to discharge compressed gas thereto whereby to create turbulence in the working chamber charge.

2. The engine of claim 1 wherein said accumulator means includes an orifice and valve means which open to receive gas freely into said accumulator means and close to direct escaping gas through the orifice in a high velocity jet.

3. The engine of claim 2 wherein said valve means includes a dished check valve element and said orifice is in said valve element.

4. A rotary internal combustion engine comprising
a housing enclosing a cavity having a peripheral inner wall,
a piston mounted for eccentric rotation within said cavity and having a plurality of apices connected by working surfaces, said apices contacting said chamber inner wall to define three working chambers between said piston working surfaces and said inner wall, each of said chambers moving with said piston and being varied in volume by the eccentric piston motion so as to pass sequentially through phases of intake, compression, expansion and exhaust during engine operation,
inlet and outlet means in said housing and cooperating with said piston to control gas flow to and from said working chambers, and
accumulator means in said housing and having an opening through said inner wall so as to connect with each of said chambers in sequence, said accumulator opening being positioned to sequentially receive gas at elevated pressures from each of said chambers during a portion of the period including the compression and expansion phases thereof and to subsequently expel pressurized gas through said opening to the following one of said chambers during a portion of the period including the intake phase and low pressure portions of the compression phase thereof, whereby turbulence is created in the working chamber charge.

5. The engine of claim 4 wherein said accumulator means includes an orifice and valve means which open to receive gas freely into said accumulator means and close to direct escaping gas through the orifice in a high velocity jet.

6. The engine of claim 5 wherein said valve means includes a dished check valve element and said orifice is in said valve element.

7. A rotary internal combustion engine comprising
    a housing enclosing a cavity having a two-lobed peripheral inner wall,
    a piston mounted for eccentric rotation within said cavity and having three apices connected by working surfaces, said apices contacting said chamber inner wall to define three working chambers between said piston working surfaces and said inner wall, each of said chambers moving with said piston and being varied in volume by the eccentric piston motion so as to pass sequentially through phases of intake, compression, expansion and exhaust during engine operation,
    inlet and outlet means in said housing and cooperating with said piston to control gas flow to and from said working chambers and
    accumulator means in said housing and opening through said inner wall so as to connect with each of said chamber in sequence, said accumulator opening being positioned to sequentially receive gas at elevated pressures from each of said chambers during the compression phase thereof and to subsequently expel pressurized gas through said opening to the following one of said chambers during the intake phase thereof, whereby turbulence is created in the working chamber charge.

8. The engine of claim 7 wherein said accumulator means includes a check valve member having an orifice therein, said valve member being openable to receive gas freely into said accumulator means and closable to direct gas escaping from said accumulator through said orifice in a high velocity jet.

9. The engine of claim 8 wherein said accumulator means is positioned to receive gas from one chamber up to approximately the end of its compression phase and to begin expelling gas to the following chamber near the end of its intake phase.

References Cited

UNITED STATES PATENTS

| | | |
|---|---|---|
| 3,168,078 | 2/1965 | Lamm. |
| 3,227,145 | 1/1966 | Bernard. |
| 3,288,120 | 11/1966 | Lamm et al. |
| 3,292,600 | 12/1966 | Liebel. |
| 3,297,005 | 1/1967 | Lamm. |

FOREIGN PATENTS

| | | |
|---|---|---|
| 983,167 | 2/1965 | Great Britain. |
| 995,101 | 6/1965 | Great Britain. |

MARK NEWMAN, Primary Examiner

PO-1050
(5/69)

UNITED STATES PATENT OFFICE
CERTIFICATE OF CORRECTION

Patent No. __3,487,815__    Dated __January 6, 1970__

Inventor(s) __Craig Marks__

It is certified that error appears in the above-identified patent and that said Letters Patent are hereby corrected as shown below:

Column 3, Line 69, "working combustion chamber" should be --working (combustion) chamber--.

Column 4, Line 60, "three" should be --a plurality of--.

Column 5, Line 34, "chamber" should be --chambers--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents